United States Patent [19]
Bonta

[11] Patent Number: 6,091,962
[45] Date of Patent: Jul. 18, 2000

[54] METHOD AND APPARATUS FOR RE-ESTABLISHING A COMMUNICATION IN A WIRELESS COMMUNICATION SYSTEM

[75] Inventor: Jeffrey D. Bonta, Arlington Heights, Ill.

[73] Assignee: Motorola, Inc., Schaumburg, Ill.

[21] Appl. No.: 09/016,168

[22] Filed: Jan. 30, 1998

[51] Int. Cl.[7] .................................................. H04Q 7/20
[52] U.S. Cl. ............................................ 455/502; 455/438
[58] Field of Search ..................................... 455/502, 436, 455/437, 438, 434, 515, 450, 455, 435

[56] References Cited

U.S. PATENT DOCUMENTS

| | | | |
|---|---|---|---|
| 5,280,541 | 1/1994 | Marko et al. | 455/462 |
| 5,488,640 | 1/1996 | Redden et al. | 455/13.2 X |
| 5,544,224 | 8/1996 | Jonsson et al. | 455/455 X |
| 5,546,464 | 8/1996 | Raith et al. | 380/48 |
| 5,566,225 | 10/1996 | Haas | 455/423 |
| 5,752,185 | 5/1998 | Ahuja | 455/414 |
| 5,913,167 | 6/1999 | Bonta et al. | 455/436 |
| 5,943,334 | 8/1999 | Buskens et al. | 370/350 |

*Primary Examiner*—William G. Trost
*Attorney, Agent, or Firm*—Richard A. Sonnentag; R. Louis Breeden

[57] ABSTRACT

A method and corresponding apparatus for re-establishing a communication in a wireless communication system is disclosed. A serving base-station (32) detects that a synchronization with a mobile station (38) has been lost and chooses a target base-station (34) to attempt to establish synchronization with the mobile station (38). If synchronization is established, the communication with the mobile station (38) is re-established by the target base-station (34). The method and corresponding apparatus does not require any handoff-related signaling to the mobile station (38) to essentially effect a communication handoff from the serving base-station (32) to the target base-station (34).

23 Claims, 2 Drawing Sheets

METHOD AND APPARATUS FOR RE-ESTABLISHING A COMMUNICATION IN A WIRELESS COMMUNICATION SYSTEM

FIELD OF THE INVENTION

This invention relates generally to wireless communication systems, and more particularly to performing handoff in a wireless communication system.

BACKGROUND OF THE INVENTION

In conventional wireless communication systems that handle voice calls, a premium is placed on minimizing the number of dropped calls. Dropped calls cause a loss of revenue to a wireless communication system operator, such as a cellular operating company, and also lead to customer dissatisfaction with wireless communication service. For example, cellular subscribers who lose communication on a cellular telephone call must call again and thereby be inconvenienced by the dropped call.

Accordingly, there is a need for a method and apparatus for improving wireless communication system performance by reducing the number of dropped calls.

DETAILED DESCRIPTION OF A PREFERRED EMBODIMENT

Figure 1:
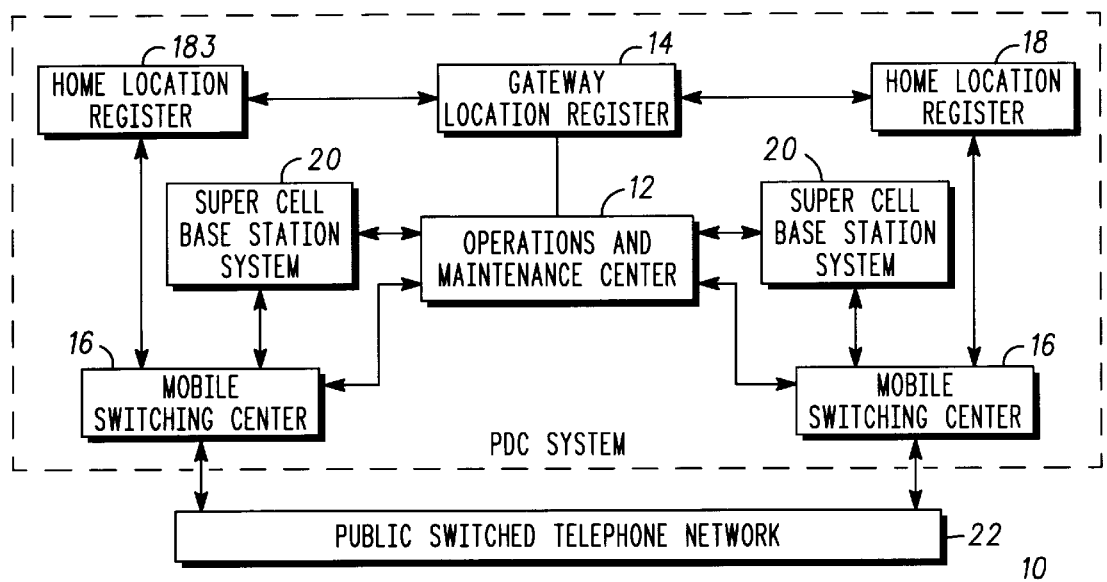
FIG. 1 is a block diagram illustrating a preferred embodiment of a wireless communication system.

Generally stated, a method and corresponding apparatus for re-establishing a communication in a wireless communication system is disclosed. A serving base-station detects that a synchronization with a mobile station has been lost and chooses a target base-station to attempt to establish synchronization with the mobile station. If synchronization is established, the communication with the mobile station is re-established by the target base-station. The method and corresponding apparatus does not require any handoff-related signaling to the mobile station to essentially effect a communication handoff from the serving base-station to the target base-station.

Stated more specifically, a method of re-establishing a communication in a wireless communication system is disclosed which includes the steps of determining that synchronization on a communication channel between a mobile station and a serving base-station has been lost and requesting, from the serving base-station, a target base-station to establish synchronization with the mobile station via the lost channel. The communication is re-established when synchronization between the target base-station and the mobile station is established. In the preferred embodiment, the step of determining that synchronization has been lost is performed by the serving base-station and the channel further comprises a frequency and timeslot in a time division multiple access (TDMA) wireless communication system.

In the preferred embodiment, the target base-station establishes synchronization and re-establishes the communication via a reserved channel. Use of the reserved channel by the target base-station temporarily violates a channel reuse pattern associated with the target base-station. To overcome this, the method also includes the step of performing an intra-cell handoff at the target base-station from the reserved channel to a channel compatible with the channel reuse pattern associated with the target base-station when the target base-station re-establishes communication with the mobile station. The entire re-establishment of the communication is transparent to the mobile station.

Also in the preferred embodiment, the target base-station is chosen from a list of suitable target base-stations which is provided to the serving base-station by the mobile station. In an alternate embodiment, the serving base-station likewise requests a plurality of target base-stations to establish synchronization with the mobile station via the channel. In this scenario, re-establishment of the communication is with the target base-station (out of the plurality of target base-stations) which establishes synchronization with the mobile station.

A base-station in a wireless communication system is also disclosed which includes a transceiver for transmitting and receiving a communication and synchronization information from a mobile station and a synchronization detection circuit for detecting when synchronization between the base-station and the mobile station has been lost. A controller requests a target base-station to establish synchronization and re-establish communication with the mobile station when the synchronization between the base-station and the mobile station has been lost. The synchronization information can either be synchronization bursts or a mid-amble sequence, and a memory is used for storing information related to a channel in which the communication occurred and a mid-amble sequence. The request to the target base-station includes the information related to the channel to be used by the target base-station for PDC and US TDMA applications, while the request to the target base-station includes the information related to the channel and the mid-amble sequence to be used by the target base-station for GSM applications.

A wireless communication system for re-establishing a communication is also disclosed. In the wireless communication system, a serving base-station includes a means for determining that synchronization on a communication channel between a mobile station and a serving base-station has been lost and a means for requesting a target base-station to establish synchronization with the mobile station via the lost channel. A target base-station within the wireless communication system includes a means for re-establishing the communication when synchronization between the target base-station and the mobile station is established. Again, the channel comprises a frequency and timeslot in a time division multiple access (TDMA) wireless communication system and the request to the target base-station includes the frequency and timeslot to be used by the target base-station. The frequency and timeslot to be used by the target base-station are reserved by the target base-station. Use of the reserved frequency and timeslot by the target base-station temporarily violates a channel reuse pattern associated with the target base-station.

A target base-station in the wireless communication system are chosen from a list of suitable target base-stations which is provided to the serving base-station by the mobile station. In an alternate embodiment, the means for requesting could request a plurality of target base-stations to establish synchronization with the mobile station via the channel. The means for re-establishing the communication, in this embodiment, re-establishes the communication with the target base-station (out of the plurality of target base-stations) which establishes synchronization with the mobile station. In still an alternate embodiment, the serving base-station additionally attempts to establish synchronization and re-establish the communication when a loss of synchronization is detected.

FIG. 1 illustrates a preferred embodiment of a wireless communication system 10. The wireless communication system 10 is preferably a cellular system such as that defined by the Digital Cellular Telecommunication System for PDC specification RCR Standard 27A (PDC standard). Although reference will be made herein to the PDC standard, the present invention is applicable to other digital wireless communication systems such as USDC and GSM. As such, the preferred embodiment wireless communication system is a time division multiple access (TDMA) communication system, but other wireless communication systems having similar message structure could likewise benefit from the improvement.

As shown in FIG. 1, the wireless communication system 10 includes an operations and maintenance center (OMC) 12, a gateway location register (GLR) 14, mobile switching centers (MSC) 16, home location registers (HLR) 18, and base-station systems (BSS) 20. The MSCs 16 are each connected to a public switched telephone network (PSTN) 22 using standard communication links. As shown in FIG. 1, each MSC 16 is connected to the OMC 12, a BSS 20, and an HLR 18. The GLR 14 is connected to the HLRs 18 and to the OMC 12. Each BSS 20 is connected to the OMC 12. A more detailed description of the architecture of the wireless communication system may be found in the PDC standard which is incorporated by reference herein.

Figure 2:
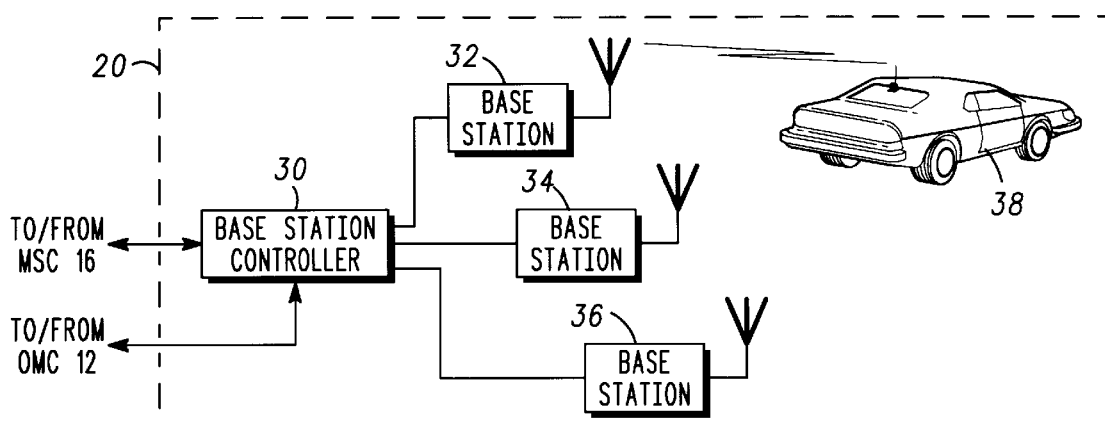
FIG. 2 is a block diagram of the base station system of FIG. 1.

FIG. 2 is a block diagram of the base station system 20 of FIG. 1.

As shown in FIG. 2, a base-station controller (BSC) 30 is coupled to a plurality of base-stations 32, 34, 36. Although not specifically shown in FIG. 2, each base-station 32, 34, 36 covers a predetermined coverage area and each have different channel reuse patterns as is well known in the art. As shown in FIG. 2, base-station 32 is considered a serving base-station since it is in radio frequency (RF) communication with mobile station 38 via a TDMA channel. In the preferred embodiment, the TDMA channel is comprised of a frequency and timeslot assignment. Base-stations 34, 36 are considered target base-stations since, if necessary, they are available to accept a communication handover of mobile station 38 as is well known in the art.

As stated above, in TDMA wireless communication systems such as Japan's digital cellular (PDC) or North American Digital Cellular (US TDMA) as defined in EIA IS-54, the communication protocol between the mobile station 38 and the serving base-station 32 includes a verification of a synchronization pattern contained within the traffic channel frame structure which is transmitted/received every 20 msec. The mobile station 38 and the serving base-station 32 independently start internal timers each time that the synchronization pattern does not match an expected synchronization pattern. These internal timers run for approximately 200 milliseconds (msec.) and if the expected synchronization pattern is not received within that 200 msec., then the mobile station 38 and/or the serving base-station 32 declares a loss of synchronization with the other end of the communication link.

At that time, an attempt is made by serving base-station 32 to re-establish synchronization of the communication link. The method to establish or re-establish synchronization is performed with a synchronization burst (SB) exchange between the mobile station 38 and the serving base-station 32 on the assigned traffic channel. The synchronization burst exchange is a rapid repeat of a shortened burst containing a larger synchronization pattern (32 bits) that must be decoded and compared with an expected pattern by the opposite end of the communication link within a predetermined amount of time. The exchange starts with the SB1 signal bursts from serving base-station 32. If mobile station 38 is able to receive and recognize the synchronization pattern, it will return a series of SB2 signal bursts which serving base-station 32 must be able to decode and compare with an expected pattern. If this is successful, a second exchange then occurs in the same fashion starting with SB3 and ending with SB4. If the exchange of SB1–SB4 bursts are successful, then normal traffic channel frames commence with the original synchronization pattern which is 20 bits in length. If this exchange is not successful, the call is dropped.

In the Groupe Special Mobile (GSM) TDMA Digital Cellular System, synchronization is accomplished by the use of mid-amble sequence within the traffic channel timeslot as is well known in the art. Briefly, when either the receiver in the mobile station 38 or the serving base-station 32 receives the traffic channel timeslot, the mid-amble sequence is compared with a known sequence stored locally in the mobile station 38 and the serving base-station 32. A correlation is performed between the received mid-amble sequence and the known sequence, and if the number of bit errors resulting from the correlation is below a predetermined threshold, synchronization is achieved. On the other hand, if the correlation produces bit errors greater than the threshold for a predetermined number of consecutive timeslots, then a loss of synchronization between the mobile station 38 and the serving base-station 32 is declared.

Typically, the loss of synchronization is due to very low signal-to-noise (S/N) level in either the uplink (mobile station 38 to base-station 32 direction), downlink (base-station 32 to mobile station 38 direction), or both links. This condition is most prevalent in microcellular system configurations where increased channel reuse of traffic channel frequencies contributes to a higher level of co-channel and adjacent channel interference. As such, the configuration shown in FIG. 2 could best be thought of as a microcellular wireless communication system; macrocellular wireless communication systems, however, suffer the same problems. As mobile station 38 moves throughout the network, the communication link is often susceptible to interference or low noise conditions as it moves into busy intersections or around street corners since the S/N level drops very quickly in these locations. As it only takes 200 msec. for the mobile station 38 and the serving base-station 32 to loose synchronization with one another under low S/N level conditions, it is generally not possible to hand the mobile station 38 over to a target base-station 34, 36 since mobile station 38 is incapable of hearing a handover commands from the serving base-station 32 when it looses synchronization with the serving base-station 32. The end result is that the communication between the serving base-station 32 and the mobile station 38 is completely lost, or "dropped."

Figure 3:
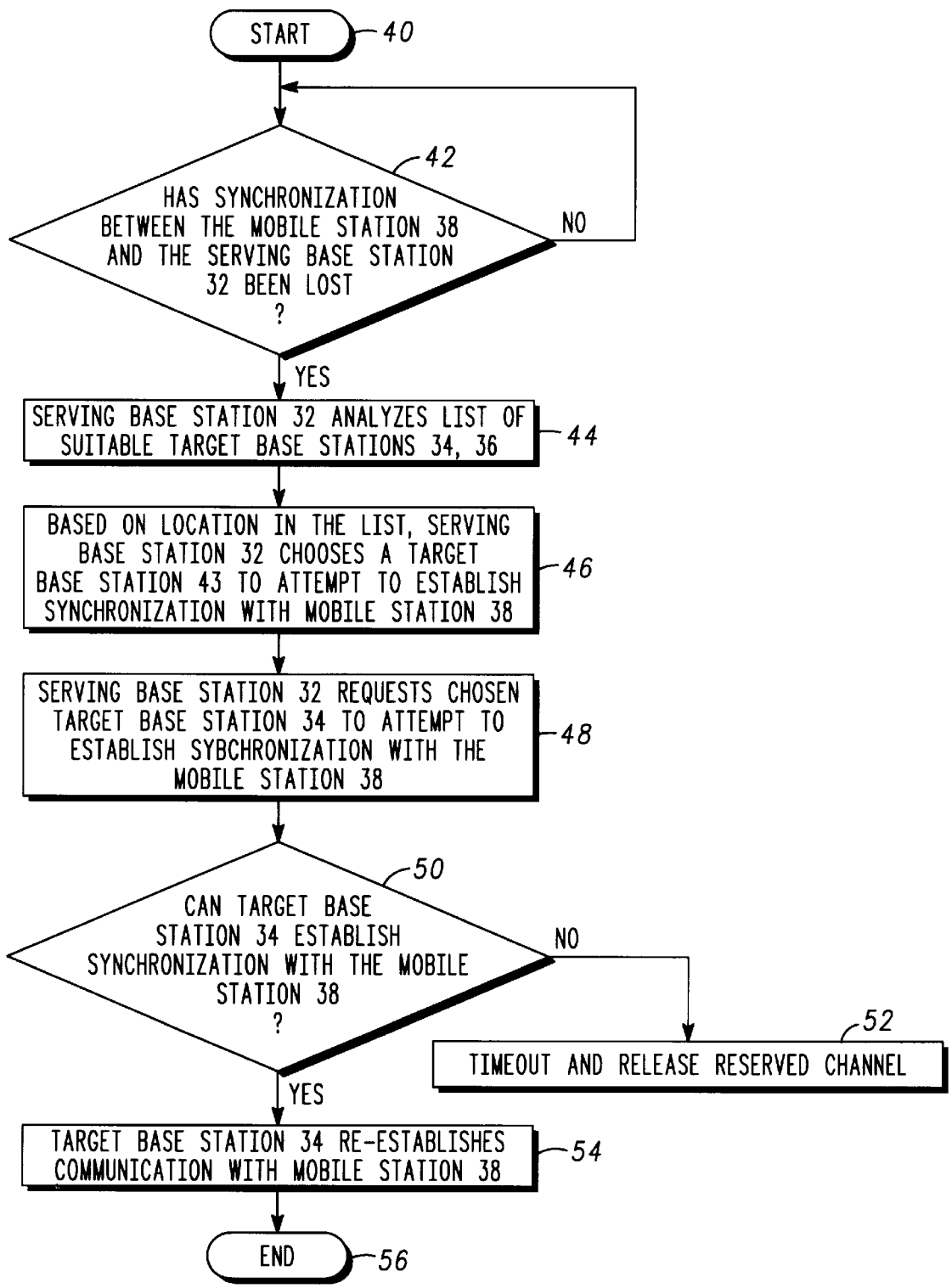
FIG. 3 generally depicts a flow chart of communication re-establishment in accordance with the invention.

FIG. 3 generally depicts a flow chart of communication re-establishment in accordance with the invention. As shown in FIG. 3, the process starts at step 40 and proceeds to step 42 where a test determines whether synchronization between the mobile station 38 and the serving base-station 32 has been lost. In the preferred embodiment, this test is performed by the serving base-station 32. If the test is negative, the test is repeated. When positive, the process proceeds to step 44 where the serving base-station 32 analyzes a list of suitable target base-stations 34, 36. In the preferred embodiment, the list of suitable target base-stations 34. 36 is provided to the serving base-station 32 by the mobile station 38 by a well known procedure called mobile assisted handoff (MAHO). Briefly, during MAHO, mobile station 38 actually measures the signal level of signals transmitted from all target base-stations and transmits these measured results back to the serving base-station 32. One skilled in the art will realize that the number of suitable target base-stations in the list is variable; in this description, only two target base-stations 34, 36 are on the list for clarity.

At step 46, serving base-station 32 chooses a target base-station (for example, target base-station 34) to attempt to establish synchronization with mobile station 38. The choice is based on the location in the list of target base-station 34. In this example, mobile station 38, during MAHO, would have reported to serving base-station 32 prior to loss of synchronization that target base-station 34 is transmitting the strongest signal out of all target base-stations 34, 36. At step 48, serving base-station requests chosen target base-station 34 to attempt to establish synchronization with mobile station 38. In the preferred embodiment, the request from the serving base-station 32 to thee target base-station 34 includes the channel in which the re-establishment of the communication is to occur. For a base-station compatible with the above mentioned GSM communication system, the request includes not only the channel in which the re-establishment of the communication is to occur but also the mid-amble sequence to be used to establish synchronization. In the preferred embodiment, the attempt by the target base-station 34 to establish synchronization in its attempt to re-establish the communication is performed on a channel reserved by the target base-station 34 and via the synchronization burst (SB) process described above. Since the reserved channel used by target base-station 34 will be the same as the channel used between serving base-station 32 and mobile station 38, and as stated above, different base-stations 32, 34, 36 use different channel reuse patterns, use of the reserved channel by the target base-station will temporarily violate the channel reuse pattern associated with target base-station 34. At step 50, a test is performed to determine if target base-station 34 can establish synchronization with mobile station 38. If the test is negative, target base-station 34 will timeout and release the reserved channel at step 52 and the process ends at step 56. If the test is positive, target base-station 34 re-establishes communication with mobile station 38 at step 54 and the process again ends at step 56. The entire process described above with reference to FIG. 3 is transparent to mobile station 38.

Directly after communication is re-established by target base-station 34 to mobile station 38 in accordance with the invention, the communication is via a channel which violates the channel reuse pattern associated with target base-station 34. To mitigate the minor detrimental effects this may have, target base-station 34 performs an intra-cell handoff from the reserved channel to a channel compatible with the channel reuse pattern associated with target base-station 34. Additionally, while a negative test result at step 50 above assumes the process is complete, the process could equally return to step 46 where another target base-station (for example, target base-station 36) is chosen and the subsequent steps repeated. It is possible to try multiple target base-stations while mobile station 38 is "stranded" since dropped calls typically take up to five seconds to occur.

Additionally, step 46 in the preferred embodiment indicates that only a single target base-station 34 is chosen to attempt to establish synchronization as shown in FIG. 3, however, step 46 in an alternate embodiment could equally choose multiple target base-stations 34 and 36 to attempt to establish synchronization. In that instance, both target base-stations 34 and 36 would attempt to establish synchronization with mobile station 38 via the synchronization burst (SB) process described above, and the first target base-station 34 or 36 which established synchronization would re-establish communication with mobile station 38. In yet another embodiment, when serving base-station 32 detects a loss of synchronization with mobile station 38, serving base-station 32 could likewise attempt to establish synchronization with mobile station 38 or disable its downlink transmission to mobile station 38 so that mobile station 38 can better receive downlink transmissions from target base-stations 32 and/or 34.

Figure 4:
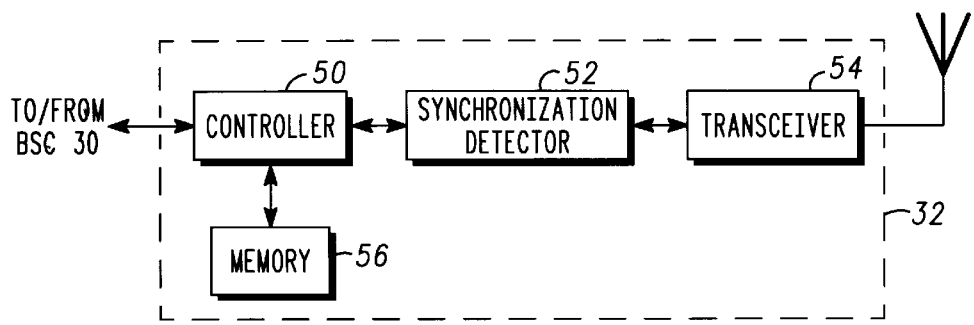
FIG. 4 generally depicts a block diagram of a base-station suitable for initiating a communication re-establishment in accordance with the invention.

FIG. 4 generally depicts a block diagram of a base-station suitable for initiating a communication re-establishment in accordance with the invention. In this embodiment, the base-station is serving base-station 32, but one skilled in the art will realize that target base-stations 34 and 36 are similarly equipped. As shown in FIG. 4, a transceiver (transmitter/receiver) 54 transmits and receives a communication and synchronization information from mobile station 38. In this embodiment, the synchronization information is either synchronization bursts (SB) as implemented in PDC and US TDMA or a mid-amble sequence as implemented in GSM. Coupled to transceiver 54 is a synchronization detector 52 which detects the loss of synchronization as described above. When a loss of synchronization is detected, a signal is sent to controller 50 which requests a target base-station to establish synchronization and re-establish communication with mobile station 38 via the BSC 30. Coupled to controller 50 is a memory 56 which stores, inter alia, information related to a channel in which the communication occurred and a mid-amble sequence (for the GSM implementation).

The invention, in its broader aspects, is therefore not limited to the specific details, representative apparatus, and illustrative examples shown and described above. Various modifications and variations can be made to the above specification without departing from the scope or spirit of the present invention, and it is intended that the present invention cover all such modifications and variations provided they come within the scope of the following claims and their equivalents.

What I claim is:

1. A method of re-establishing a communication in a wireless communication system, the method comprising the steps of:

determining that synchronization on a communication channel between a mobile station and a serving base-station has been lost;

requesting, by the serving base-station, a target base-station different from the serving base station to establish synchronization with the mobile station via the lost channel; and re-establishing the communication when synchronization between the target base-station and the mobile station is established, wherein no handoff-related signaling to the mobile station is required to effect a communication handoff from the serving base station to the target base station, and wherein the target base-station establishes synchronization and re-establishes the communication via a reserved channel, the use of which temporarily violates a channel reuse pattern associated with the target base-station.

2. The method of claim 1, wherein the step of determining that synchronization has been lost is performed by the serving base-station.

3. The method of claim 1, wherein the channel further comprises a frequency and timeslot in a time division multiple access (TDMA) wireless communication system.

4. The method of claim 1, further comprising the step of performing an intra-cell handoff at the target base-station from the reserved channel to a channel compatible with the channel reuse pattern associated with the target base-station when the target base-station re-establishes communication with the mobile station.

5. The method of claim 1, wherein the re-establishment of the communication is transparent to the mobile station.

6. The method of claim 1, wherein the target base-station is chosen from a list of suitable target base-stations.

7. The method of claim 6, wherein the list of suitable target base-stations is provided to the serving base-station by the mobile station.

8. The method of claim 1, wherein the step of requesting further comprises the step of requesting, from the serving base-station, a plurality of target base-stations to establish synchronization with the mobile station via the channel.

9. The method of claim 8, wherein the step of re-establishing further comprises the step of re-establishing the communication with the target base-station out of the plurality of target base-stations which establishes synchronization with the mobile station.

10. A serving base-station in a wireless communication system, the serving base-station comprising:
   a transceiver for transmitting and receiving a communication and synchronization information from a mobile station;
   a synchronization detection circuit for detecting when synchronization between the serving base-station and the mobile station has been lost; and
   a controller for requesting a target base-station different from the serving base-station to establish synchronization and re-establish communication with the mobile station via a reserved channel, the use of which temporarily violates a channel reuse pattern associated with the target base-station, when the synchronization between the serving base-station and the mobile station has been lost, wherein no handoff-related signaling to the mobile station is required to effect a communication handoff from the serving base station to the target base station.

11. The base-station of claim 10, wherein the synchronization information further comprises either synchronization bursts or a mid-amble sequence.

12. The base-station of claim 11, further comprising memory for storing information related to a channel in which the communication occurred and a mid-amble sequence.

13. The base-station of claim 12, wherein the request to the target base-station includes the information related to the channel to be used by the target base-station.

14. The base-station of claim 12, wherein the request to the target base-station includes the information related to the channel and the mid-amble sequence to be used by the target base-station.

15. A wireless communication system for re-establishing a communication, the wireless communication system comprising: a serving base-station comprising:
   means for determining that synchronization on a communication channel between a mobile station and the serving base-station has been lost; and
   means for requesting a target base-station different from the serving base station to establish synchronization with the mobile station via the lost channel; and
a target base-station comprising:
   means for re-establishing the communication when synchronization between the target base-station and the mobile station is established, wherein no handoff-related signaling to the mobile station is required to effect a communication handoff from the serving base station to the target base stations wherein the target base station is arranged to establish synchronization and re-establish the communication via a reserved channel, the use of which temporarily violates a channel reuse pattern associated with the target base-station.

16. The wireless communication system of claim 15, wherein the channel further comprises a frequency and timeslot in a time division multiple access (TDMA) wireless communication system.

17. The wireless communication system of claim 16, wherein the request to the target base-station includes the frequency and timeslot to be used by the target base-station.

18. The wireless communication system of claim 17, wherein the frequency and timeslot to be used by the target base-station are reserved by the target base-station.

19. The wireless communication system of claim 15, wherein the target base-station is chosen from a list of suitable target base-stations.

20. The wireless communication system of claim 19, wherein the list of suitable target base-stations is provided to the serving base-station by the mobile station.

21. The wireless communication system of claim 15, wherein the means for requesting further comprises means for requesting a plurality of target base-stations to establish synchronization with the mobile station via the channel.

22. The wireless communication system of claim 21, wherein the means for re-establishing further comprises means for re-establishing the communication with the target base-station out of the plurality of target base-stations which establishes synchronization with the mobile station.

23. The wireless communication system of claim 15, wherein the serving base-station additionally attempts to establish synchronization and re-establish the communication when a loss of synchronization is detected.

\* \* \* \* \*